United States Patent
Bruns et al.

(10) Patent No.: US 7,594,116 B2
(45) Date of Patent: Sep. 22, 2009

(54) MEDIATED KEY EXCHANGE BETWEEN SOURCE AND TARGET OF COMMUNICATION

(75) Inventors: Logan O'Sullivan Bruns, Napa, CA (US); Jahanshah Moreh, Beverly Hills, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 739 days.

(21) Appl. No.: 10/908,124

(22) Filed: Apr. 28, 2005

(65) Prior Publication Data

US 2006/0248336 A1    Nov. 2, 2006

(51) Int. Cl.
*H04L 29/06* (2006.01)
*H04L 9/32* (2006.01)
*H04L 9/00* (2006.01)
*H04K 1/00* (2006.01)
*G06F 7/04* (2006.01)
*H04L 9/08* (2006.01)
*G06F 15/167* (2006.01)
*G06F 17/30* (2006.01)

(52) U.S. Cl. .............. 713/171; 713/152; 713/168; 380/30; 380/277; 726/5

(58) Field of Classification Search .............. 713/171
See application file for complete search history.

(56) References Cited

U.S. PATENT DOCUMENTS

| | | | |
|---|---|---|---|
| 6,584,564 B2 * | 6/2003 | Olkin et al. | 713/152 |
| 2001/0002486 A1 | 5/2001 | Kocher et al. | |
| 2003/0002662 A1 | 1/2003 | Nishioka et al. | |
| 2003/0074552 A1 | 4/2003 | Olkin et al. | 713/152 |
| 2003/0076959 A1 | 4/2003 | Chui | |
| 2004/0148500 A1 | 7/2004 | Olkin et al. | 713/201 |
| 2004/0151323 A1 | 8/2004 | Olkin et al. | 713/168 |

FOREIGN PATENT DOCUMENTS

EP            1069726 A2 *    1/2001

OTHER PUBLICATIONS

Rolf Oppliger, "Certfied Mail: The Next Challenge for Secure Messaging", Aug. 2004, Communications of the ACM, vol. 47, Issue 8, pp. 75-79.*
PCT International Search Report and PCT Written Opinion of the International Searching Authority for PCT/US06/14921, Jan. 10, 2008.

* cited by examiner

*Primary Examiner*—Matthew B Smithers
*Assistant Examiner*—Courtney D Fields
(74) *Attorney, Agent, or Firm*—Patent Venture Group; Raymond E. Roberts

(57) ABSTRACT

A system for communicating a message securely between a sender and a receiver. The sender provides a key server with a string specifying the receiver. The key server obtains a message key and a particular envelope encryption key corresponding with a particular envelope decryption key, encrypts the message key with the envelope encryption key (creating the envelope), and provides the envelope to the sender-client. The sender-client encrypts the message with the message key and provides it and the envelope to the receiver. The receiver-client receives these and asks an authentication server for the envelope decryption key. The authentication server obtains the envelope decryption key and provides it to the receiver. The receiver then decrypts the envelope with the envelope decryption key, to get the message key, and decrypts the message.

31 Claims, 5 Drawing Sheets

FIG. 1 (background)

FIG. 2 (background)

| Parameter | Description |
|---|---|
| SND | The sender of the message |
| RCV | The receiver of the message |
| AN-SND | The authentication server associated with the sender |
| SN-SND | The key server associated with the sender |
| AN-RCV$_x$ | The authentication server associated with receivers in the domain $x$ |
| $a$ | The private value of SN-SND or AN-SND |
| $A$ | The public value of SN-SND or AN-SND, computed as $g\wedge a\ mod\ p$ |
| $b$ | The private value of AN-RCV |
| $B$ | The public value of AN-RCV computed as $g\wedge b\ mod\ p$ |
| $s$ | A set consisting of arbitrary strings (e.g., an email addresses, a role, or any other attribute). The authenticated possession of one of the set's members (e.g., $s_i$) by a receiver will result in the release of the private envelope key. |
| Hash | A conventional one-way hashing function |
| $e$ | The envelope public encryption key |
| $d$ | The envelope private decryption key |
| $k$ | The message key |
| $N$ | The domain of one of the receivers. The sender uses the domain to determine which AN-RCV public key(s) it should use to create the envelope. |
| $g$ | A conventional *generator* of the group in which the calculation is performed. In practice many groups can be used. This document uses the multiplicative integer group $Z^*_p$. |
| $p$ and $q$ | Prime number of the group in which the calculation is performed. In practice many groups can be used. This document uses the multiplicative integer group $Z^*_p$. Typically, p=q, but this is not necessary. |
| mod | The modulus function. |
| $\wedge$ | The exponentiation operator |

TBL. 1

MEDIATED KEY EXCHANGE BETWEEN SOURCE AND TARGET OF COMMUNICATION

TECHNICAL FIELD

The present invention relates generally to providing security for communications in networks, such as the Internet, and more particularly to the secure communication of messages within such networks.

BACKGROUND ART

It is known in the art to use a symmetric key server for managing and distributing encryption keys. For example, in a secure email system, a sender of email may request that such a key server create and store an encryption key. The sender may then encrypt their email with the created key and send it to one or more recipients. A given recipient can then request the key from the key server, which determines the authenticity of the recipient. If the recipient is authorized to receive the key (as specified by the original sender), the key server then delivers the decryption key to the recipient, who can use it to decrypt the email. Note, in passing, that in a symmetric key system the encryption and decryption keys are the same.

Distributing symmetric keys via a key server has many positive attributes, including the following. The sender (or any authorized party) can determine when a recipient requested and received the decryption key. This "key advisement" can usefully form the basis of an audit system. The sender (or any authorized party) can also control access to the decryption key, specifying "not-before" and/or "not-after" release times for a key. In this way, the decryption key can be made available during a certain time window.

These positive attributes of the key server scheme are realized because a recipient must be on-line to request the key, that is, to communicate with the key server to obtain the key from it. However, this makes "offline decryption" impossible.

Offline decryption is therefore typically implemented via "key enveloping." In this technique the sender encrypts the message with a random key (termed a "message key") and then encrypts the message key with another key, which is called the "envelope key." Currently, the following three methods are used for deriving envelope keys. The envelope key can be derived from a password that is known to the sender and all of the recipients. Alternately, a public key of each recipient can be used as their respective envelope key, meaning that the sender must create one envelope per recipient. And, somewhat similar to the recipient's public key method, the public key(s) can be derived from an "identity string" for the recipient (such as their email address) using an Identity Based Encryption (IBE) algorithm. Note, in passing, that an asymmetric key system is one where different public and private keys for encryption and decryption are employed.

The first method noted above, enveloping a message key with another key that is derived from a password, is weak because the password is often susceptible to discovery by brute force or off-line dictionary attacks. Given that most passwords need to be memorized by human users, and given that passwords must consist of printable characters, the entropy of a key derived from a password is anywhere from 1.5 to 5 bits per character. Thus, the effective length of a key derived from a twelve character password (which has 50% more characters than a typical password of eight characters) is anywhere from 18 to 60 bits. By today's standards, such a key is very weak and thus subject to attacks that often will succeed.

The second method noted above, that of enveloping a message key with the recipient's public key, is very strong. However, this imposes a number of burdensome requirements. For example, all of the recipients must have a public key, and the public keys of all of the recipients must be available to the sender at the time of enveloping, and the private key of each recipient must be available at the place where the recipient desires to read the message. For instance, if the recipient stores his or her private key in a computer at work, they would not be able to decrypt the email at a home computer that does not also have a copy of their private key.

The third method noted above, enveloping a message key with the recipient's IBE public key is very strong. However, this also imposes a number of burdensome requirements. For example, again, all of the recipients must assert their respective identity strings in order to receive the corresponding private key, and the system that generates the private keys (typically called a "private key generator") is a high value "target." If this server is compromised, an adversary can then decrypt all of the messages that were ever sent (or that will be sent until the system's parameters are actually changed).

In summary, a password-based scheme is easy to use but offers weak security. A public key system offers strong security but is very difficult to deploy and use. And an IBE system is secure and somewhat easy to use, but its compromise can have catastrophic results. Because of these particular reasons, as well as others, the current state-of-the-art schemes do not simultaneously satisfy the three requirements of security, ease-of-use, and low risk.

DISCLOSURE OF INVENTION

Accordingly, it is an object of the present invention to provide a system for mediated key exchange between a source and a target of a communication.

Briefly, one preferred embodiment of the present invention is a process for communicating a message securely between a sender and a receiver. The sender provides a key server with a string specifying one or more attributes of the receiver. The key server then obtains a private value (a) of its own that corresponds with public value (A) of its own. The key server also obtains a public value (B) of an authentication server (one that corresponds with a private value (b) of the authentication server). The key server further obtains a message key. The key server calculates a hash (h) of the receiver string. The key server also calculates an envelope decryption key (d), wherein $d = g\char`\^\{B^{ah} \bmod p\} \bmod q$ in which g is a generator of and p and q are prime numbers in a group in which calculation is performed. The key server he calculates an envelope encryption key (e), wherein $e = g^d \bmod p$. The key server next encrypts the message key with the envelope encryption key, thereby creating the envelope, and it provides the envelope to the sender. The sender encrypts the message with the message key and provides it and the envelope to the receiver. The receiver accepts these and asks an authentication server for the envelope decryption key. The authentication server obtains the public value (A) of the key server and calculates the envelope decryption key (d), wherein $d = g\char`\^\{A^{bh} \bmod p\} \bmod q$. The authentication server then provides the envelope decryption key to the receiver. And the receiver then decrypts the envelope with the envelope decryption key, thus getting the message key, and decrypts the message with the message key.

Briefly, another preferred embodiment of the present invention is a process for making an envelope encryption key (e) that corresponds with an envelope decryption key (d), for communicating a message securely between a sender and a receiver. A generator (g) of a group in which calculation is performed is selected and a prime number (p) in the group is also selected. Then $e=g^d$ mod p is calculated.

Briefly, another preferred embodiment of the present invention is a process for making an envelope decryption key (d) that corresponds with an envelope encryption key (e), for communicating a message securely between a sender and a receiver. A hash (h) of a receiver string specifying one or more attributes of the receiver-client is obtained. A public value (A) of the party that created the envelope encryption key (e) is also obtained. Then $d=g^{\{A^{bh} \bmod p\}} \bmod q$ is calculated, wherein b is a private value and g is a generator of and p and q are prime numbers in a group in which calculation is performed.

Briefly, another preferred embodiment of the present invention is a process for making an envelope for communicating a message securely between a sender and a receiver. A message key is obtained. An envelope encryption key (e) is also obtained, one corresponding with an envelope decryption key (d), wherein $e=g^d$ mod p in which g is a generator of and p is a prime number in a group in which calculation is performed. The message key is then encrypted with the envelope encryption key, thereby creating the envelope.

Briefly, another preferred embodiment of the present invention is a process for a sender to encrypt a message for a receiver. A message key is obtained. An envelope is also obtained, one containing the message key encrypted with an envelope encryption key (e) corresponding with an envelope decryption key (d), wherein $e=g^d$ mod p in which g is a generator of and p is a prime number of a group in which calculation is performed. The message is then encrypted with the message key.

Briefly, another preferred embodiment of the present invention is a process for receiver to decrypt a message. A secure message including the message in encrypted form and an envelope containing a message key to decrypt the secure message are obtained. The envelope is one that has been encrypted with an envelope encryption key (e) corresponding with an envelope decryption key (d). The envelope decryption key is then also obtained, wherein $d=g^{\{A^{bh} \bmod p\}} \bmod q$ in which A is a public value of the party that created e, b is a private value of the party that is providing d, h is a hash of a receiver string specifying one or more attributes of the receiver-client, and g is a generator of and p and q are prime numbers in a group in which calculation is performed. The envelope is then decrypted with the envelope decryption key, getting the message key, and the secure message is decrypted with the message key into the message.

An advantage of the present invention is that it is secure. In particular, the invention does not rely on a password-based scheme, and thus is not subject to weaknesses of such schemes.

Another advantage of the invention is that it is easy to use. In particular, the present invention does not rely on a Public Key Infrastructure (PKI) in which its senders and receivers of messages are members, and thus is not subject to the deployment difficulties of PKI.

Another advantage of the invention is that it is low-risk. In particular, the present invention does not rely on a traditional Identity Based Encryption (IBE) scheme, and thus is not subject to the catastrophic results than can occur when such schemes are breached.

Another advantage of the invention is that it retains the positive attributes of authentication and key server schemes.

Another advantage of the invention is that it permits offline message decryption. The receiver of a message need not be on-line when the sender is online or when an entity the sender has used to facilitate encryption is online. Of course, the receiver can simply use an already obtained envelope decryption key, if it has one. More importantly, however, the receiver can obtain the envelope decryption key from an entity that it has easy and trustworthy access to. For this, the potentially different entities used by the sender and the receiver merely need to have an established a trust relationship that can require as little as one previous communication between them.

And another advantage of the invention is that it is useful for communicating a broad range of electronic messaging system, including but not limited to email, instant messaging, and application-to-application messaging.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings and table in which.

Figure 4:
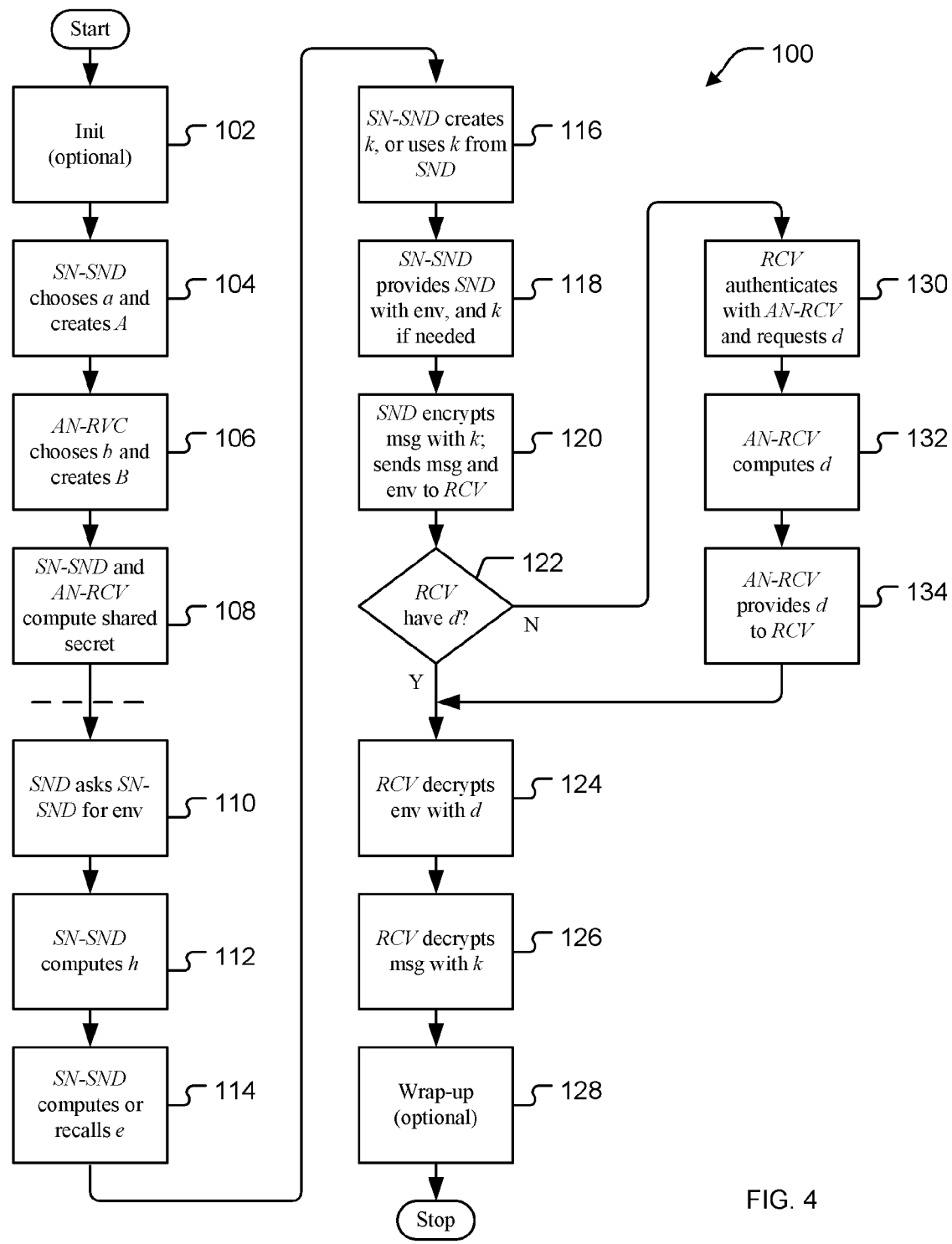
FIG. 4 is a flow chart depicting an encryption-decryption process in accord with the present invention.

TBL. 1 lists terminology used in describing an algorithm used by the encryption-decryption process in FIG. 4.

In the various figures of the drawings, like references are used to denote like or similar elements or steps.

BEST MODE FOR CARRYING OUT THE INVENTION

A preferred embodiment of the present invention is a system for mediated key exchange between a source and a target of a communication. As illustrated in the various drawings herein, and particularly in the view of FIG. 3, preferred embodiments of the invention are depicted by the general reference character 80.

The present inventors have developed a technology that can simultaneously satisfy requirements with respect to strong security, ease of use, and low risk. Furthermore, this technology enables organizational users to leverage their existing trust relationships to accommodate users for both on-line and/or offline decryption of data.

Even though email is used herein to illustrate a typical messaging scenario, the invention is by no means limited to email. Any messaging deployment that requires secure messages (e.g., instant messaging, application-to-application messaging, etc.) may potentially benefit from use of this invention. Furthermore, even though messaging is used herein to illustrate a typical data handling scenario, the invention is by no means limited to data in the form of messages. Data handling deployments that require securing data (e.g., for local or remote storage, for long term achieving, for maintaining data on-line yet complying with organizational security policies or governmentally imposed security compliances, etc.) may also potentially benefit from use this invention. Email, specifically, and messages, more generally, are simply examples of applications where the present invention is especially needed and where that need is widely recognized, and of applications for which this invention can be expected to be rapidly adopted and particularly appreciated. An additional consideration in picking email and messaging as contexts in which to disclose this invention is the established body of background art in these contexts (e.g., the current use of authentication and key servers). Much of this background art has not yet been applied, or is not widely known, in the more general context of data handling. The use herein of email messages as data with which this present invention can work should therefore not be mistaken to restrict the scope of the present invention.

Unless explicitly stated otherwise, the following terminology is used herein. The term "message" means the unit of data that is encrypted and decrypted. As noted above, we use email as an example of a message and we use messages as an example of data. Other kinds of messages are readily envisioned, including instant messages, messages communicated between two applications using a protocol other than email (e.g., FTP, SOAP, etc.), messages consisting of permanent files, etc. The term "sender" means the encryptor of a message. The terms "receiver" and "recipient" mean the decryptor of a message. Note that the list of receivers can include the sender, or even be solely the sender. This is the case when a person encrypts data for secure storage or communication so that only he or she can decrypt it later. The terms "sender" and "receiver" are primarily used herein, to avoid reader confusion while first grasping what is being disclosed, but the broader terms "source" and "target" are more evocative of the potential roles of users of this invention. The term "message key," or simply "the Key," means a symmetric key that is used to encrypt or decrypt a message. The term "envelope encryption key" means the public key that encrypts a message key. And the term "envelope decryption key" means a secret key that decrypts a message key.

Figure 1:
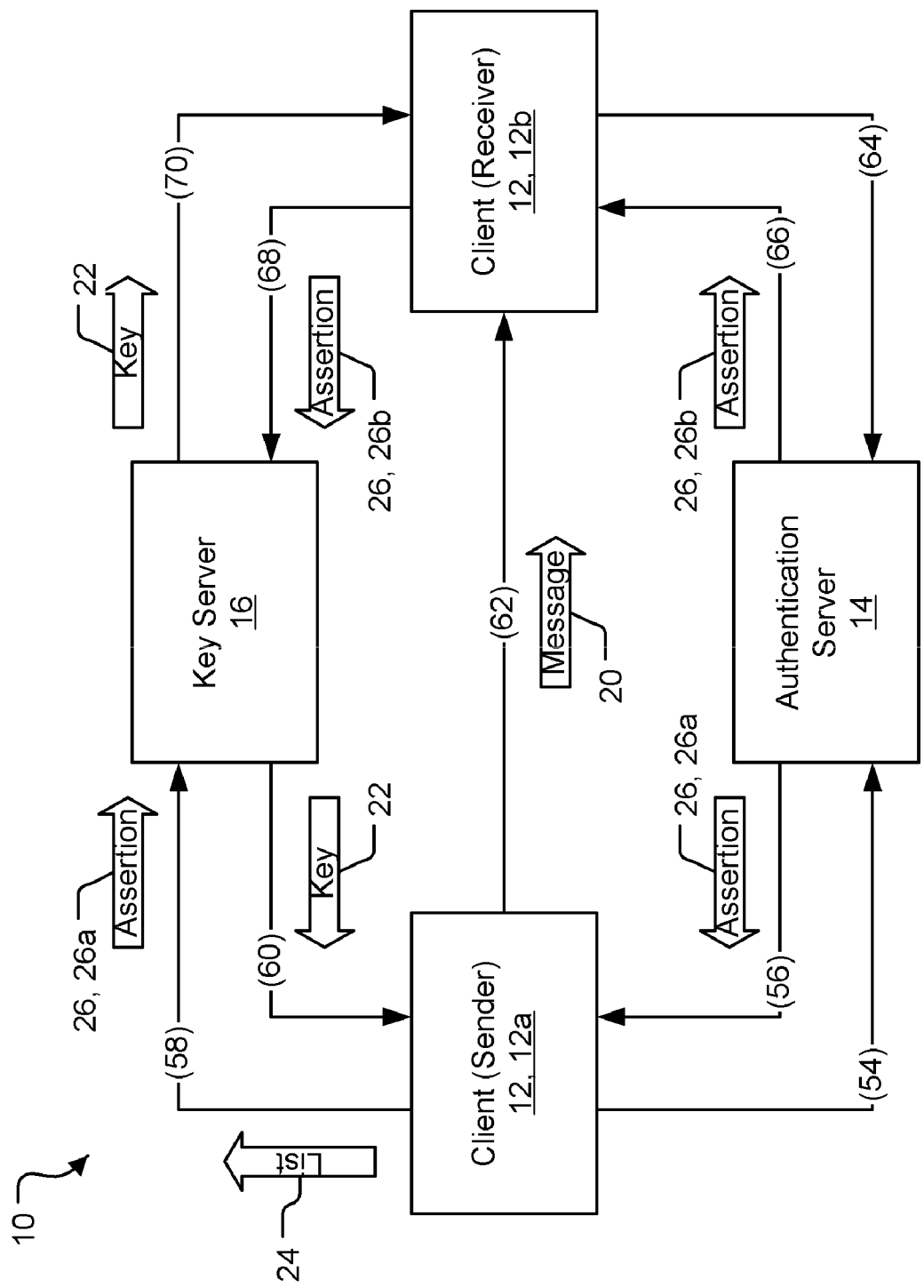
FIG. 1 is a schematic block diagram depicting the major components of an exemplary secure messaging system.

FIG. 1 is a schematic block diagram depicting an exemplary secure messaging system 10 that is in accord with a series of previous inventions by some of the present inventors. In particular, these include U.S. Pat. No. 6,584,564, titled "Secure E-Mail System"; pending U.S. application Ser. No. 10/305,726, titled "Security Server System"; pending U.S. App. No. 10/707,190, titled "System For Implementing Business Processes Using Key Server Events"; pending U.S. App. No. 10/707,191, titled "Implementing Nonrepudiation And Audit Using Authentication Assertions And Key Servers"; and pending Int. App. PCT/US03/37954, titled "Key Server For Security And Implementing Processes With Nonrepudiation And Audit." These are all hereby incorporated herein by reference.

The secure messaging system 10 as shown in FIG. 1 provides an overview of concepts in the inventors' prior inventions that are germane here, and introduces three major components: clients 12, an authentication server 14, and a key server 16, that will be referenced extensively when the new inventive system for mediating the delivery of decryption keys is discussed below.

Turning now to the major components, a sender 12a and a receiver 12b are conceptually one component in that both are clients 12 of the authentication server 14 and the key server 16. As is the typical case in messaging systems, the secure messaging system 10 can be used by clients 12 who may alternately (or concurrently) be senders 12a or receivers 12b. All interactions between a client 12 (either a sender 12a or a receiver 12b) and an authentication server 14 or a key server 16 can be encrypted using short-lived session keys.

Briefly, the secure messaging system 10 permits the sender 12a to send a message 20, encrypted with a message key 22, to one or more receivers 12b specified in an authorized receivers list 24. To facilitate this the authentication server 14 issues assertions 26 (either a sender assertion 26a or a receiver assertion 26b, as the case may be) that the key server 16 employs to control access to the message key 22.

Figure 2:
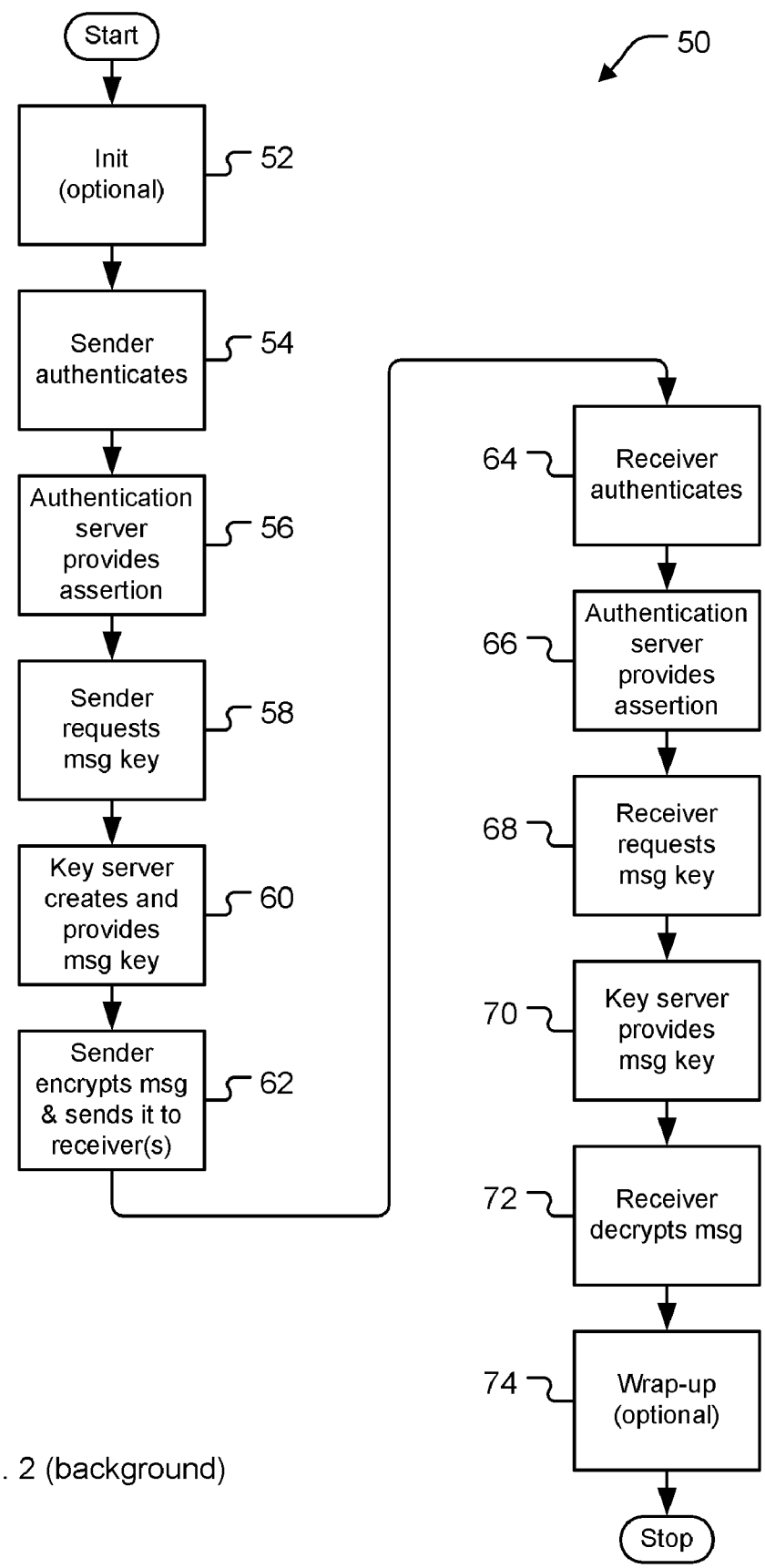
FIG. 2 is a flow chart depicting an interaction process between the components in FIG. 1.

FIG. 2 is a flow chart depicting an interaction process 50 between the components in FIG. 1. The steps below also correspond with the labeled arrows in FIG. 1.

In an optional step 52, any desired initialization can occur.

In a step 54, the sender 12a (a client 12) authenticates with the authentication server 14.

In a step 56, the authentication server 14 authenticates the sender 12a via whatever method is appropriate under the circumstances and previously set criteria. Various methods for this are known in the art. Upon successful authentication, the authentication server 14 creates a digitally signed sender assertion 26a, vouching for the identity of the sender 12a and gives that assertion 26 to the sender 12a.

In a step 58, the sender 12a delivers its assertion 26 to the key server 16, along with the list 24 of authorized receivers 12b of the message 20, and requests a message key 22.

In a step 60, the key server 16 creates the message key 22 and stores it along with the list 24 of authorized receivers 12b. Next, the key server 16 delivers the message key 22 to the sender 12a.

In a step 62, the sender 12a encrypts the message 20 with the message key 22 and sends it to the receivers 12b. Note that there may be many intermediary relays between the sender 12a and the receivers 12b (not shown in the figures). Such intermediaries simply relay the message 20 but are not privy to the message key 22 (unless an intermediary also happens to be an authorized receiver 12b of the message 20).

In a step 64, the receiver 12b authenticates with the authentication server 14. Note that an authentication server 14 with which the receiver 12b authenticates need not be (but could be) the same as the authentication server 14 with which the sender 12a authenticates.

In a step 66, the authentication server 14 authenticates the receiver 12b via whatever method is appropriate. Again, various methods for this are known in the art. Upon successful authentication, the authentication server 14 creates a digitally signed receiver assertion 26b, vouching for the identity of the receiver 12b and gives that assertion 26 to the receiver 12b.

In a step 68, the receiver 12b delivers its assertion 26 to the key server 16 along with a request for the message key 22.

In a step 70, the key server 16 delivers the message key 22 to the receiver 12b.

In a step 72, the receiver 12b can then use the message key 22 to decrypt the message 20. And in an optional step 74 any desired wrap-up can occur, and the interaction process 50 is finished.

It should be noted that there must exist an a priori trust relationship between the authentication server 14 (or authentication servers 14) and the key server 16. That is, the key server 16 trusts the authentication server 14 to vouch for the identity of a set of clients 12 (senders 12a or receivers 12b). The key server 16 can implement this trust relationship by acquiring a public verification key of the authentication server 14 (e.g., the X.509 certificate of the authentication server 14, bearing the public key). The authentication server 14 can then use the corresponding private signing key to sign the assertions 26.

The secure messaging system 10 as described above requires that the sender 12a and all of its receivers 12b be on-line to receive the message key 22, though it is not required that they all be on-line at the same time. Accordingly, while the secure messaging system 10 can simultaneously satisfy the requirements of strong security, ease of use, and low risk, that it does not accommodate both on-line and/or offline decryption of messages.

Figure 3:
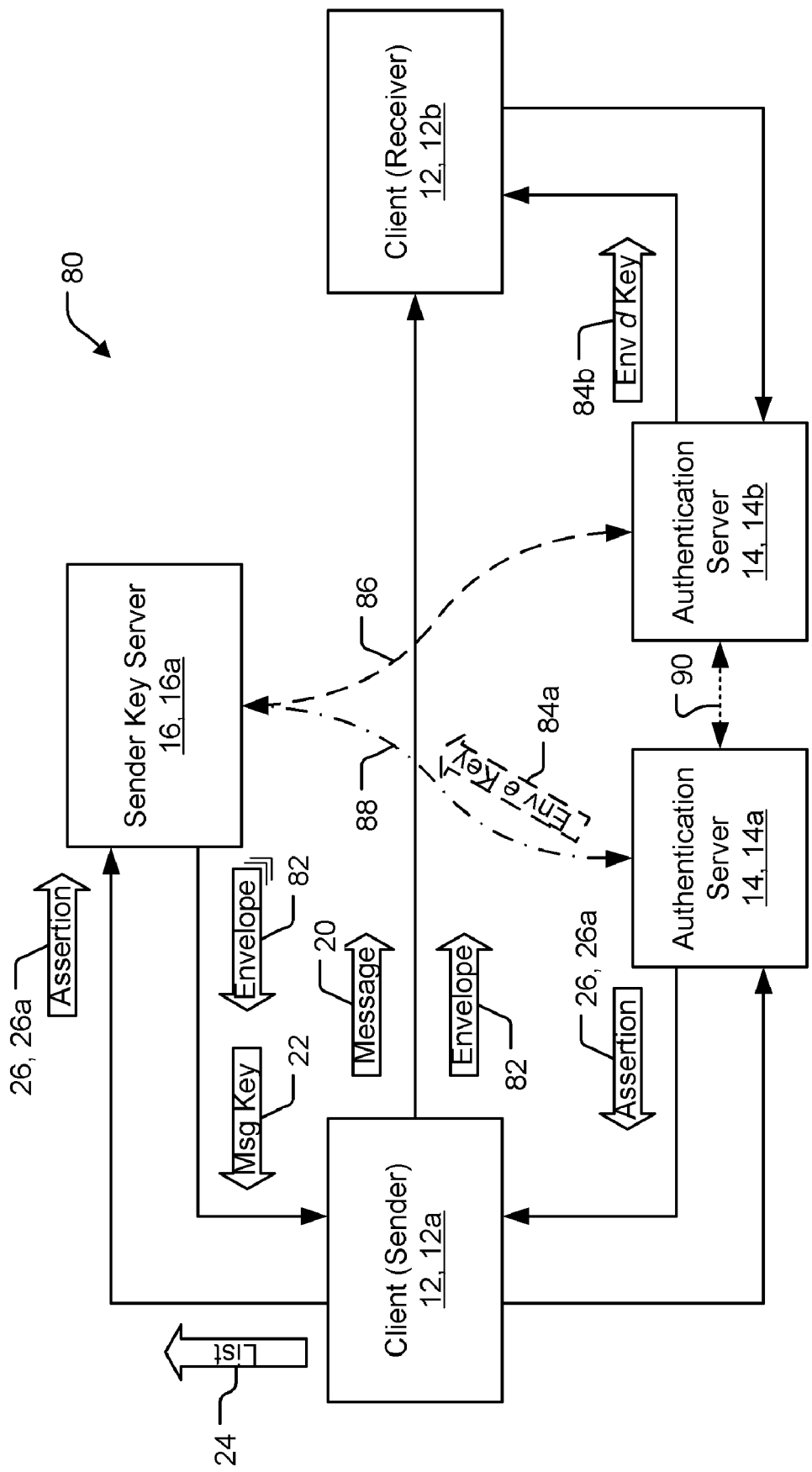
FIG. 3 is a schematic block diagram depicting how the exemplary secure messaging system of FIG. 1 can be extended into a mediated key exchange system in accord with the present invention.

FIG. 3 is a schematic block diagram depicting how a messaging system, such as the secure messaging system 10 in FIG. 1, can be improved into a mediated key exchange system 80 that can provide offline decryption capability whereby the receiver 12b only needs to communicate with the authentication server 14 once in order to get a private envelope decryption key.

To illustrate the mediated key exchange system 80 here a sophisticated deployment scenario is used in which the sender 12a and the receivers 12b are affiliated with different authentication servers 14, a sender authentication server 14a and a receiver authentication server 14b. The sender 12a authenticates to its own sender authentication server 14a and receives an envelope 82 from the key server 16 that is encrypted and contains the message key 22. The envelope 82 is encrypted with a "public" envelope encryption key 84a, and then can only be decrypted with a "private" envelope decryption key 84b. The envelope encryption key 84a is shown in ghost outline in FIG. 3 because it is only passed in one embodiment (the latter of the two discussed below). In both embodiments discussed, the receiver 12b authenticates to its own receiver authentication server 14b to receive the envelope decryption key 84b.

Note that the key server 16 used by the sender 12a creates the envelope 82 whereas the receiver 12b here need not even have a key server 16. Instead, the receiver authentication server 14b delivers the private envelope decryption key 84b to the receiver 12b (this is the private key whose corresponding public key was used to create the envelope 82 containing the message key 22.) It is then the responsibility of the receiver 12b to use the envelope decryption key 84b to decrypt the envelope 82 and to retrieve the message key 22 from it if they wish to decrypt the message 20.

To simplify the rest of this discussion, the key server 16 in FIG. 3 will also be referred to as a sender key server 16a. The receiver 12b can have its own a key server (not shown), say, for itself to act as a sender 12a, and this can be the same or a different one than the one shown in FIG. 3.

As was the case for FIG. 1, the message key 22 here can be symmetric, and thus be used for both encryption and decryption of the message 20. In contrast, the envelope keys here can be asymmetric, consisting of a "private" decryption key corresponding with but not being the same as a "public" encryption key used to create the envelope 82 containing the message key 22.

Of course, the sender 12a may send copies of the message 20 to multiple receivers 12b, by stating multiple receivers 12b in the list 24. The same message key 22 can be used for all of the copies of the message 20 going to all of the receivers 12b in the list 24, with different envelope keys used for each receiver 12b. Alternately, both the message key 22 and the envelope keys can be different for each receiver 12b. As a practical matter, it is typically easiest if there is only one copy of the ultimate message, consisting of the original message 20 encrypted with the message key 22 and then sent along with all of the envelopes 82 to each of the receivers 12b.

For the first approach depicted in FIG. 3 to work, the sender key server 16a must trust the receiver authentication server 14b. The reason for this is that the receiver authentication server 14b should only release the private envelope decryption key 84b to receivers 12b that it has authenticated. Establishing this trust therefore necessitates a one-time exchange of trust material between the receiver authentication server 14b and the sender key server 16a, with this trust material then establishing a cryptographic binding between the sender key server 16a and the receiver authentication server 14b. This exchange of trust material is represented in FIG. 3 by a dashed line 86.

In the inventor's presently preferred approach, the envelope keys are based on an improved Diffie-Hellman key agreement and the envelope encryption algorithm uses the well-known ElGamal public key encryption. TBL. 1 lists terminology used now in describing the algorithm.

FIG. 4 is a flow chart depicting one possible encryption-decryption process 100 in accord with the present invention. First, in an optional step 102, any desired initialization can occur (e.g., the sender 12a can authenticate with the sender authentication server 14a).

In a step 104, SN-SND chooses a random number a for its private value and creates the corresponding public value A as follows:

$$A = g^a \bmod p$$

In a step 106, AN-RCV chooses a random number b for its private value and creates the corresponding public value B as follows:

$$B = g^b \bmod p$$

In a step 108, SN-SND and AN-RCV exchange their public values and compute the shared secret as follows. SN-SND computes $B^a \bmod p$, which is $g^{ba} \bmod p$ and AN-RCV computes $A^b \bmod p$, which is $g^{ab} \bmod p$. Because $g^{ba} = g^{ab}$, SN-SND and AN-RCV possess the same shared secret, which is only known to them.

Steps 102-108 represent system initialization steps and need occur only once. [For security reasons, the two parties here (SN-SND and AN-RCV here) may periodically change their shared secret. In any case, the frequency of this exchange is much lower (say yearly) than the frequency of creating envelope keys (quite possibly several millions per day).] Steps 104-108 are according to conventional Diffie-Hellman key agreement protocol.

The message key enveloping follows these steps:

In a step 112, SN-SND computes a hash of $s_r$ as follows:

$$h = \text{Hash}(S_r)$$

Do we need to explain what is a hash?

In a step 114, SN-SND computes the public key e (or looks it up if it had computed it previously and stored it) using the following algorithm:

$$d = g \hat{\ } \{B^{ah} \bmod p\} \bmod q$$

$$e = g^d \bmod p$$

Note, typically p=q, and the discussion herein generally presumes that to be the case, but this is not a requirement.

In a step 116, SN-SND creates a random symmetric message key k [This step is optional. Alternatively, SND can create k and send it to SN-SND and ask it to create an encrypted envelope containing k]

In a step 118, SN-SND returns to SND the message key k and an encrypted envelope containing k. The envelope is encrypted via the ElGamal public encryption algorithm using the public key e.

In a step 120, SND encrypts the message with k and sends the encrypted message and the envelope to RCV.

In a step 122, a determination is made whether RCV has already taken delivery of the private envelope key d.

If so, in a step 124 RCV simply uses d to decrypt the envelope and recover $k_1$ and in a step 126 RCV then uses k to decrypt the message. In an optional step 128 any desired wrap-up can occur, and the encryption-decryption process 100 is finished.

Otherwise, in a step 130, RCV authenticates with AN-RCV, proving to AN-RCV that it is a rightful owner of the string $s_n$RCV asks AN-RCV for the private key d of the envelope.

In a step 132, AN-RCV computes the private key by calculating the following value:

$$h=\text{Hash}(S_r)$$

$$d=g^\wedge\{A^{bh} \bmod p\} \bmod q$$

Again, typically p=q, and the discussion herein generally presumes that to be the case, but it is not a requirement.

In a step 134, AN-RCV delivers the private key d to RCV. And now steps 124-128 occur and the encryption-decryption process 100 is finished. Note, if steps 130-134 occur, in step 124 RCV can cache d for future use.

The encryption-decryption process 100 depicted in FIG. 4 is a suitable one for use by the inventive mediated key exchange system 80, but more sophisticated approaches are quite possible. For example, with reference again to FIG. 3, the inventors' presently preferred embodiment is also depicted there, and the encryption-decryption process it employs has some minor differences from the encryption-decryption process 100.

The inventors' company, Secure Data In Motion Inc., of San Mateo, Calif. (doing business as SIGABA™) is a leading provider of secure messaging systems. In particular, these systems include ones employing authentication servers and keys servers, albeit in manners not previously in accord with the present invention. For purposes of the rest of this discussion, these can be regarded as "conventional" authentication and key servers. The authentication servers 14 and the key server 16 in FIG. 3 may be conventional units that are modified to perform in accord with the present invention.

In a very basic scenario the sender 12a only needs the sender key server 16a and the receiver 12b needs only the receiver authentication server 14b. Of course, in most practical applications there will be multiple senders 12a and receivers 12b. In "real world" implementations it is therefore desirable to be able to handle tens of thousands or even tens of millions of such clients 12, and to also be able to provide desirable secure messaging options like non-repudiation, audit, etc. Also, as was noted early in this discussion, a sender 12a may be a receiver 12b, concurrently for the very same message 20 or alternately as their role changes.

The above described invention may be embodied as a process, as an envelope encryption key or an envelope decryption key or an envelope or a secure message (i.e., products made by one of the described processes), or as a computer program embodied on a conventional computer readable storage medium.

Bifurcating the services of authentication and key provision for the senders 12a facilitates providing secure messaging options. This is well known in the art and is not germane here (extensive discussion of it is provided, however, in the cited related patent applications). For this approach to work the sender key server 16a must trust the sender authentication server 14a, so that it can rely on the sender assertion 26a. This is therefore established by an exchange of trust material between the sender authentication server 14a and the sender key server 16a, represented in FIG. 3 by an intermittent line 88.

In the inventors' presently preferred embodiment the bifurcating approach just described is used, and the exchange of trust material (represented by the dashed line 86) between the receiver authentication server 14b and the sender key server 16a is not used. Instead, the sender authentication server 14a creates the envelope key pair, and provides the envelope encryption key 84a to the sender key server 16a as shown in ghost outline in FIG. 3.

Note, in both embodiments both of the envelope keys are generated by the algorithm used for the envelope encryption key 84a, so the sender key server 16a or the sender authentication server 14a creates the envelope decryption key 84b, uses it locally, and can then discard it. In contrast, the algorithm used for the envelope decryption key 84b does not require the envelope encryption key 84a, so the receiver authentication server 14b can simply directly create the envelope decryption key 84b.

For this approach, the sender authentication server 14a (AN-SND) and the receiver authentication server 14b (AN-RCV) need to possess the same shared secret (which is only known to them). Thus, with reference again to FIG. 4, in a step equivalent to step 104, the sender authentication server 14a (AN-SND, not SN-SND) chooses the random number a for its private value and creates the corresponding public value A. In a step the same as step 106, the receiver authentication server 14b (AN-RCV) chooses the random number b for its private value and creates the corresponding public value B. In a step equivalent to step 108, AN-SND (not SN-SND) and AN-RCV exchange their public values (A and B) and compute the shared secret by using their private values (a and b). This exchange is represented in FIG. 3 by a dotted line 90.

In operation, after a step the same as step 112, the sender key server 16a (SN-SND) asks the sender authentication server 14a (AN-SND) for the envelope encryption key (e) corresponding to the hash (h) in the domain N. Then, in a step equivalent to step 114, the sender authentication server 14a (AN-SND, not SN-SND) computes the envelope encryption key 84a (or recalls it) and provides it to the sender key server 16a (SN-SND). Steps the same as steps 118-130 then ensue and this embodiment otherwise proceeds the same as the encryption-decryption process 100 in FIG. 4.

Some particularly noteworthy novelties of this invention include the following. It extends a conventional Diffie-Hellman key exchange by combining it with a publicly known string to create a public/private key pair. The two parties (SN-SND and AN-RCV, or AN-SND and AN-RCV) that know the original Diffie-Hellman shared secret can then compute the public and private key pairs independently. This technique creates a new public/private key pair by leveraging the fact that the envelope key generating parties, SN-SND and AN-RCV, have an a prioritrust relationship. This trust relationship is implemented by exchange of public values and computing the same shared secret $g^{ab}$. The shared secret is then used along with an arbitrary public string (S″) to compute another, new key pair.

The invention thus allows any arbitrary string (or set of strings) to be used in computation of the new key pair. The invention also provides an ability to define a community of users (clients 12), each affiliated with one or more authentication servers 14, that are then able to send a secure message to any member of the community by knowing some public information about the member (e.g., their email address, role in the organization, etc.).

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A process for communicating a message securely between a sender-client and a receiver-client, the process comprising:
at the sender-client, providing a key server with a receiver string specifying one or more attributes of the receiver-client;
at said key server, obtaining a first private value (a) corresponding with a first public value (A), obtaining a second public value (B) of an authentication server corresponding with a second private value (b) of said authentication server, obtaining a message key, calculating a hash (h) of said receiver string, calculating an envelope decryption key (d), wherein d=g^{B^{ah} mod p} mod q in which g is a generator of and p and q are prime numbers in a group in which calculation is performed, calculating an envelope encryption key (e), wherein e=g^d mod p, encrypting said message key with said envelope encryption key (e), thereby creating an envelope, and providing said envelope to the sender-client;
at the sender-client, encrypting the message into a secure message with said message key, and providing said secure message and said envelope to the receiver-client;
at the receiver-client, accepting said secure message and said envelope, and asking said authentication server for said envelope decryption key (d);
at said authentication server, obtaining said first public value (A) of said key server, calculating said envelope decryption key (d), wherein d=g^{A^{bh} mod p} mod q, and providing said envelope decryption key (d) to the receiver-client; and
at the receiver-client, decrypting said envelope with said envelope decryption key (d) into said message key, and decrypting said secure message with said message key into the message.

2. A process for a key server to make an envelope encryption key (e) that corresponds with an envelope decryption key (d), for communicating a message securely between a sender-client and a receiver-client, the process comprising:
at the key server:
obtaining a hash (h) of a receiver string specifying one or more attributes of the receiver-client;
calculating d=g^{B^{ah} mod p} mod q, wherein:
g is a generator of a group in which calculation is performed and p and q are prime numbers in said group,
a is private value of the key server, and
B is a public value of a first authentication server;
calculating e=g^d mod p; and
providing the envelope encryption key (e) to the sender-client.

3. A process for an authentication server to make an envelope decryption key (d) that corresponds with an envelope encryption key (e), for communicating a message securely between a sender-client and a receiver-client, the process comprising:
at the authentication server:
obtaining a hash (h) of a receiver string specifying one or more attributes of the computerized receiver-client system;
obtaining a public value (A) of a party that created the envelope encryption key (e); and
calculating d=g^{A^{bh} mod p} mod q, wherein g is a generator of a group in which calculation is performed and p and g are prime numbers in said group and b is a private value of the authentication server; and
providing the envelope encryption key (e) to the sender-client.

4. An envelope decryption key (d) made by one of the processes of claim 3.

5. A process for a key server to make an envelope for communicating a message securely between a sender-client and a receiver-client, the process comprising:
at the key server:
obtaining a message key;
obtaining an envelope encryption key (e) corresponding with an envelope decryption key (d), wherein e=g^d mod p in which g is a generator of a group in which calculation is performed and p is a prime number in said group; and
encrypting said message key with said envelope encryption key (e), thereby creating the envelope; and
providing the envelope from the key server to the computerized sender-client system.

6. The process of claim 5, wherein said obtaining said message key includes accepting said message key from the sender-client.

7. The process of claim 5, wherein said obtaining said message key includes generating said message key at the key server.

8. The process of claim 5, wherein said obtaining said envelope encryption key (e) includes recalling a previously stored instance of said envelope encryption key (e).

9. The process of claim 5, further comprising:
at the key server:
choosing a private value (a);
obtaining a public value (B) of an authentication server;
obtaining a hash (h) of a receiver string specifying one or more attributes of the receiver-client; and
calculating d=g^{B^{ah} mod p} mod q, wherein q is also a prime number in said group; and
providing said envelope decryption key (d) to said sender-client.

10. An envelope made by one of the processes of claim 5-9.

11. A process for a sender-client to encrypt a message to a receiver-client, the process comprising:
at the sender-client:
obtaining a message key;
obtaining an envelope containing said message key encrypted with an envelope encryption key (e) corresponding with an envelope decryption key (d), wherein e=g^d mod p in which g is a generator of a group in which calculation is performed and p is a prime number in said group; and
encrypting the message into a secure message with said message key; and
providing said secure message from the sender-client to the receiver-client; and
providing said message key from the sender-client to the receiver-client.

12. The process of claim 11, wherein said obtaining said message key includes accepting said message key from a key server.

13. The process of claim 11, wherein:
said obtaining said message key includes generating said message key at the sender-client; and
said obtaining said envelope includes:

providing said message key to a key server; and
accepting said envelope from said key server.

14. The process of claim 11, further comprising:
at the sender-client:
authenticating with an authentication server;
accepting an assertion from said authentication server;
providing said assertion to a key server; and accepting said envelope from said key server.

15. The process of claim 11, wherein said envelope encryption key (e) also corresponds with a hash (h) of a receiver string specifying one or more attributes of the receiver-client.

16. A secure message made by one of the processes of claim 11-15.

17. A process for a receiver-client to decrypt a message, the process comprising:
at the receiver-client:
obtaining a secure message including the message in encrypted form;
obtaining an envelope including a message key to decrypt said secure message, wherein said envelope has been encrypted with an envelope encryption key (e) corresponding with an envelope decryption key (d);
obtaining said envelope decryption key (d), wherein $d=g\char`\^\{A \bmod p\} \bmod q$ in which A is a public value of a key server that created e, b is a private value of an authentication server that is providing d, h is a hash of a receiver string specifying one or more attributes of the receiver-client, and g is a generator of a group in which calculation is performed and p and q are prime numbers in said group;
decrypting said envelope with said envelope decryption key (d) into said message key; and
decrypting said secure message with said message key into the message.

18. The process of claim 17, wherein said obtaining said envelope decryption key (d) includes authenticating with said authentication server and accepting said envelope decryption key (d) from said authentication server.

19. The process of claim 18, further comprising caching said envelope decryption key (d) for future use.

20. The process of claim 17, wherein said obtaining said envelope decryption key (d) includes recalling a previously obtained said envelope decryption key (d).

21. A computer program, embodied on a tangible computer readable storage medium, for an authentication server to make an envelope decryption key (d) that corresponds with an envelope encryption key (e), for communicating a message securely between a sender-client and a receiver-client, the computer program comprising:
a code segment to run at the authentication server that obtains a hash (h) of a receiver string specifying one or more attributes of the receiver-client;
a code segment to run at the authentication server that obtains a public value (A) of a party that created the envelope encryption key (e);
a code segment to run at the authentication server that calculates $d=g\char`\^\{A^{bh} \bmod p\} \bmod q$, wherein g is a generator of a group in which calculation is performed and p and q are prime numbers in said group and b is a private value of the authentication server; and
a code segment that provides the envelope encryption key (e) to the sender-client.

22. A computer program, embodied on a tangible computer readable storage medium, for a key server to make an envelope for communicating a message securely between a sender-client and a receiver-client, the computer program comprising:
a code segment to run at the key server that obtains a message key;
a code segment to run at the key server that obtains an envelope encryption key (e) corresponding with an envelope decryption key (d), wherein $e=g^d \bmod p$ in which g is a generator of a group in which calculation is performed and p is a prime number in said group; and
a code segment to run at the key server that encrypts said message key with said envelope encryption key (e), thereby creating the envelope; and
a code segment that provides the envelope from the key server to the computerized sender-client system.

23. The computer program of claim 22, further comprising:
a code segment to run at the key server that chooses a private value (a);
obtaining a public value (B) of a trusted party;
a code segment to run at the key server that obtains a hash (h) of a receiver string specifying one or more attributes of the receiver-client;
a code segment to run at the key server that calculates $d=g\char`\^\{B^{ah} \bmod p\} \bmod q$, wherein q is also a prime number in said group; and
a code segment that provides said envelope decryption key (d) to said sender-client.

24. An envelope encryption key (e) made by one of the processes of claim 2.

25. The process of claim 2, further comprising providing the envelope decryption key (d) to a second authentication server other than said first authentication server.

26. The process of claim 3, wherein said party that created the envelope encryption key (e) is the authentication server.

27. The process of claim 3, wherein said party that created the envelope encryption key (e) is a key server.

28. A computer program, embodied on a tangible computer readable storage medium, for a key server to make an envelope encryption key (e) that corresponds with an envelope decryption key (d), for communicating a message securely between a sender-client and a receiver-client, the computer program comprising:
a code segment to run at the key server that obtains a hash (h) of a receiver string specifying one or more attributes of the receiver-client;
a code segment to run at the key server that calculates $d=g\char`\^\{B^{ah} \bmod p\} \bmod q$, wherein:
g is a generator of a group in which calculation is performed and p and q are prime numbers in said group;
a is private value of the key server; and
B is a public value of a first authentication server;
a code segment to run at the key server that calculates $e=g^d \bmod p$; and
a code segment that provides the envelope encryption key (e) to the sender-client.

29. The computer program of claim 28, further comprising a code segment that provides the envelope decryption key (d) to a second authentication server other than said first authentication server.

30. The computer program of claim 21, wherein said party that created the envelope encryption key (e) is the authentication server.

31. The computer program of claim 21, wherein said party that created the envelope encryption key (e) is a key server.

* * * * *